Oct. 5, 1943.  M. M. SAFFORD  2,331,139

EXTRUSION HEAD

Filed July 1, 1941

Inventor:
Moyer M. Safford,
by Harry E. Dunham
His Attorney.

Patented Oct. 5, 1943

2,331,139

UNITED STATES PATENT OFFICE 2,331,139

EXTRUSION HEAD

Moyer M. Safford, Schenectady, N. Y., assignor to General Electric Company, a corporation of New York Application July 1, 1941, Serial No. 400,581

1 Claim. (Cl. 18—13)

The present invention relates generally to extrusion devices, and more particularly to an extrusion head for an extruding machine which is useful for covering electrical conductors with plastic insulating material.

Extruding machines generally used at the present time are of the so-called side-delivery type that is, the wire to be covered runs through the extrusion head of the machine at right angles to the screw or worm which forces the stock through the extrusion head. Such devices require the stock to be turned at right angles to its direction of flow after leaving the worm in order to become parallel to the wire being covered. The turning or bending of the stock is not conducive to even flow, particularly when the stock is fairly stiff. The result is that there is a tendency in this type of extruding machine to produce unevenly covered wire.

In order to overcome this difficulty, so-called straight-through extruding machines have been manufactured but these machines are much more expensive than the standard side-delivery type and give considerably more trouble due to the failure of packing glands and other mechanical parts of the machines. In a straight-through delivery machine the wire to be covered runs parallel with and through the worm and extruding die. Hence the construction of such a machine requires the provision of a hole through the entire length of the worm. It is also necessary to have the worm so arranged that it can be water-cooled or steam-heated and since the wire goes through the center of the worm a complicated system of glandular packing is required. Moreover, due to the arrangement of parts in such a machine, leader adjustments are difficult to make due to inaccessibility of the parts.

Figure 1:
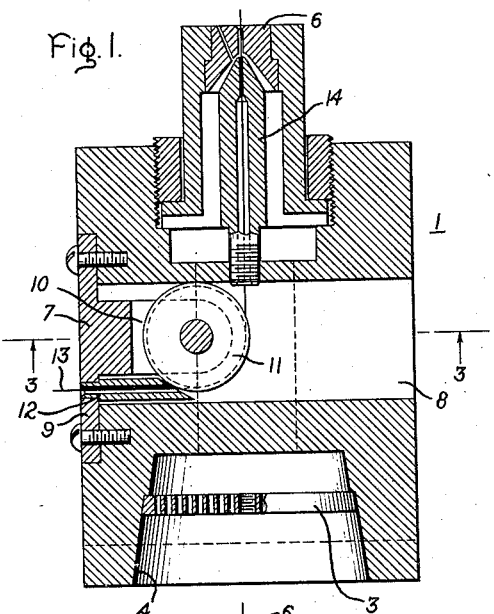
Figure 2:
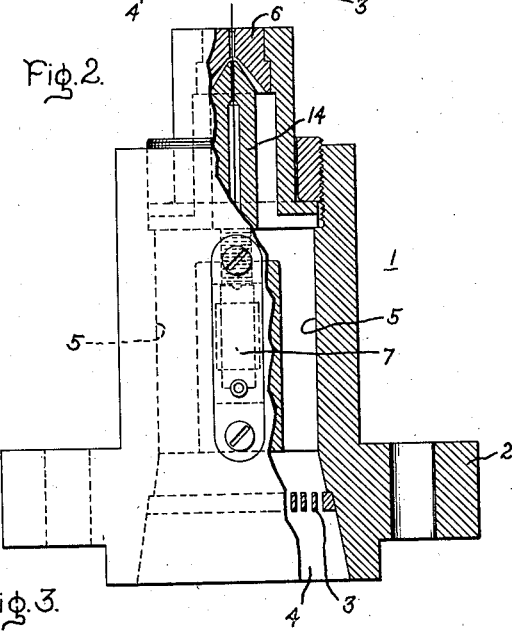
Figure 3:
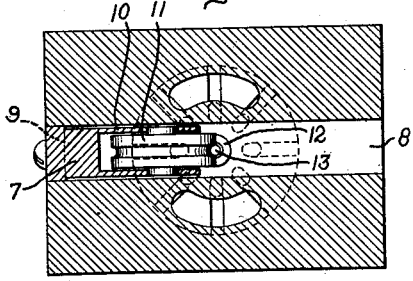

The present invention overcomes the difficulties of the standard side-delivery machine and at the same time obviates the complicated structure of the present type straight-through extruding machine. The invention will be more readily understood by reference to the following description thereof in connection with the accompanying drawing wherein Fig. 1 is a view mainly in section and partly in elevation of an extrusion head embodying my invention. Fig. 2 is a view mainly in elevation and partly in section of the extrusion head, this view being at right angles to that of Fig. 1, and Fig. 3 is a view in section taken along the line 3—3 of Fig. 1.

Referring to the drawing, it will be seen that the extrusion head, generally designated at 1, is so constructed that the stock is permitted to flow directly through it without being turned or bent in its course of travel. The extrusion head is designed so that it can be readily attached by means of the flanged collar 2 to a standard extrusion machine. The stock is fed through the extrusion head by the screw (not shown) of the extrusion machine, being forced through a screen 3 located in an opening 4 at the end of the extrusion head adjacent the extrusion machine. The stock then continues through channels 5 toward the extrusion die 6 located at the opposite end of the extrusion head. The extrusion die 6 may be of the conventional hand-centering type or a self-centering die as illustrated in the drawing and more particularly described and claimed in Safford Patent No. 2,199,209, of April 30, 1940.

Between the stock entrance end and the extrusion die there is provided a lead-in device 7 for receiving the wire to be covered. This lead-in device is removably attached to the extrusion head to facilitate its removal for cleaning or replacement, and fits into a relatively narrow slot 8 which runs transversely through the central portion of the extrusion head. The lead-in device 7 comprises a base portion 9 having formed integrally therewith a U-shaped element 10 supporting a pulley 11. A hollow guide member 12 is provided in the base portion to receive the wire 13 which is fed through it from a pay-off reel (not shown) and over the pulley 11 through the leader 14, thence to the extrusion die 6 and out of the extrusion head to a take-up reel (not shown). As shown in the drawing the hollow guide member 12 and the pulley 11 are so positioned within the extrusion head as to provide for the wire to come in at right angles to the head and then be turned through the leader 14 in a direction parallel to the path of travel of the stock.

It will be seen from the foregoing that a simple, compact structure has been provided whereby an extrusion head is obtained which will fit a standard side-delivery type extrusion machine and at the same time provide for a straight-through travel of the stock without deflecting it in its course of travel from the worm through the extrusion head. It will also be seen that a simple structure has been provided for bringing the wire to be covered into the extrusion head in a path parallel to the direction of travel of the stock and which, by virtue of its construction and arrangement in connection with the extrusion head, is easily removed for cleaning or replacement.

While the construction above described is useful for covering electrical conductors with plastic insulation material, it is particularly effective in the coating of such wire of small diameter.

What I claim as new and desire to secure by Letters Patent of the United States is:

An extrusion head adapted to be attached to a standard side-delivery extrusion machine for extruding a plastic material around an electrical wire in a path parallel to the path of travel of the material through the head, said extrusion head containing a material receiving opening located at one end of said head, an extrusion die located at the other end of said head and opposite to the material receiving opening, said head containing conveying channels located between the material receiving opening and the extrusion die, a relatively narrow slot extending transversely through the extrusion head, a wire lead-in device removably positioned in said slot including a hollow guide for receiving a wire fed therethrough and a pulley mounted in said lead-in device wholly within the slot and positioned to receive the wire from said guide and direct it into the extrusion head to the extrusion die in a path parallel to the path of travel of the material in the conveying channels.

MOYER M. SAFFORD.